D. C. THOMPSON.
VEGETABLE CUTTER.
APPLICATION FILED SEPT. 28, 1908.
1,058,116.
Patented Apr. 8, 1913.
3 SHEETS—SHEET 3.
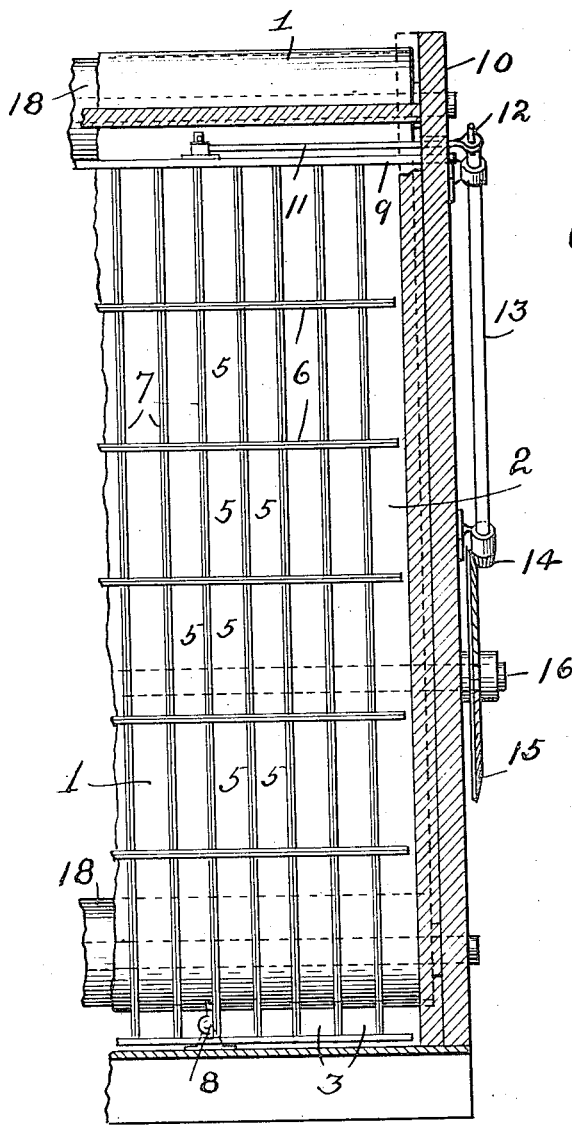
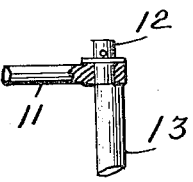
Witnesses:
Henry Lorin Wells
Harry H. Reynolds
Inventor:
Dewey C. Thompson
By Edward F. Wilson
ATTORNEY

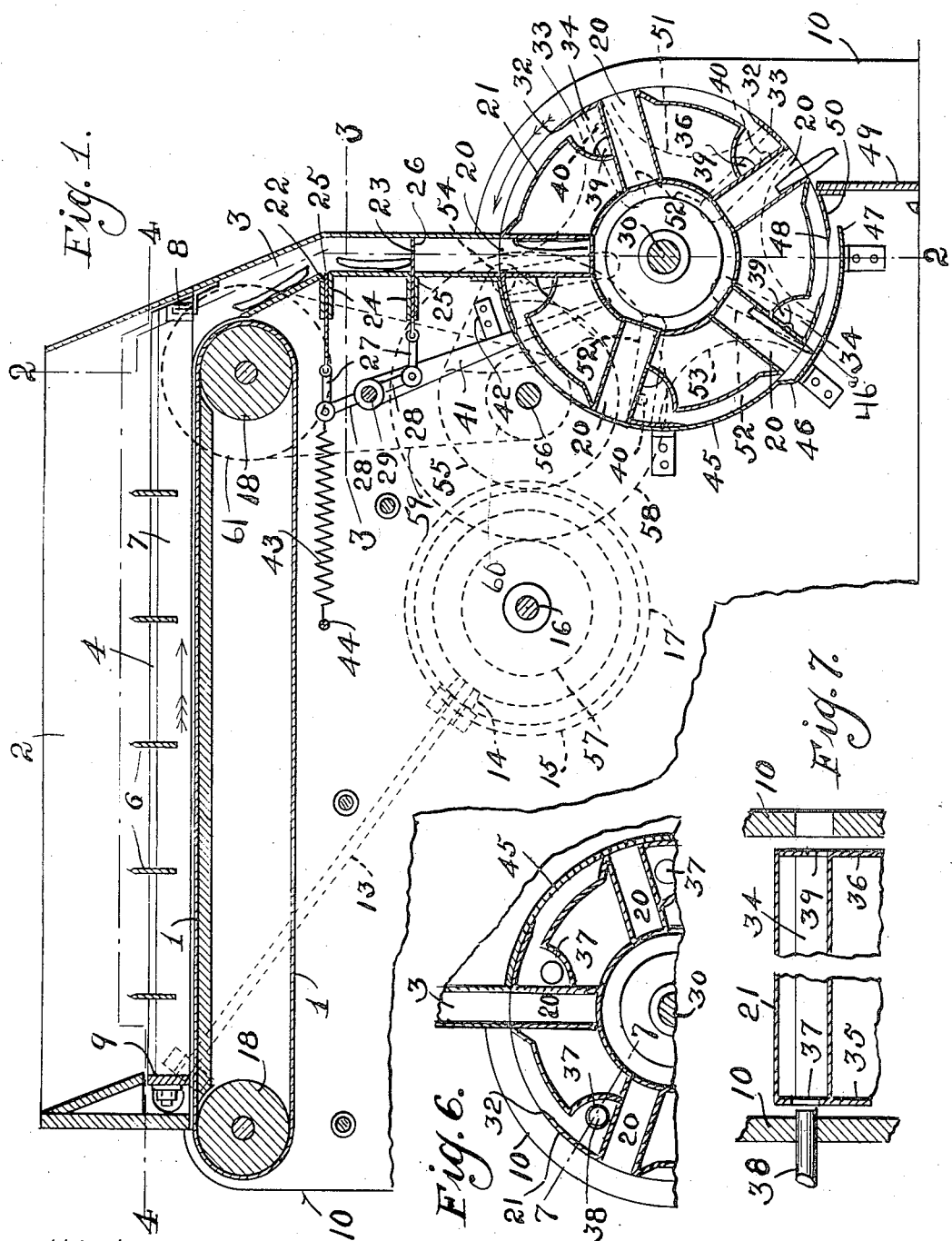

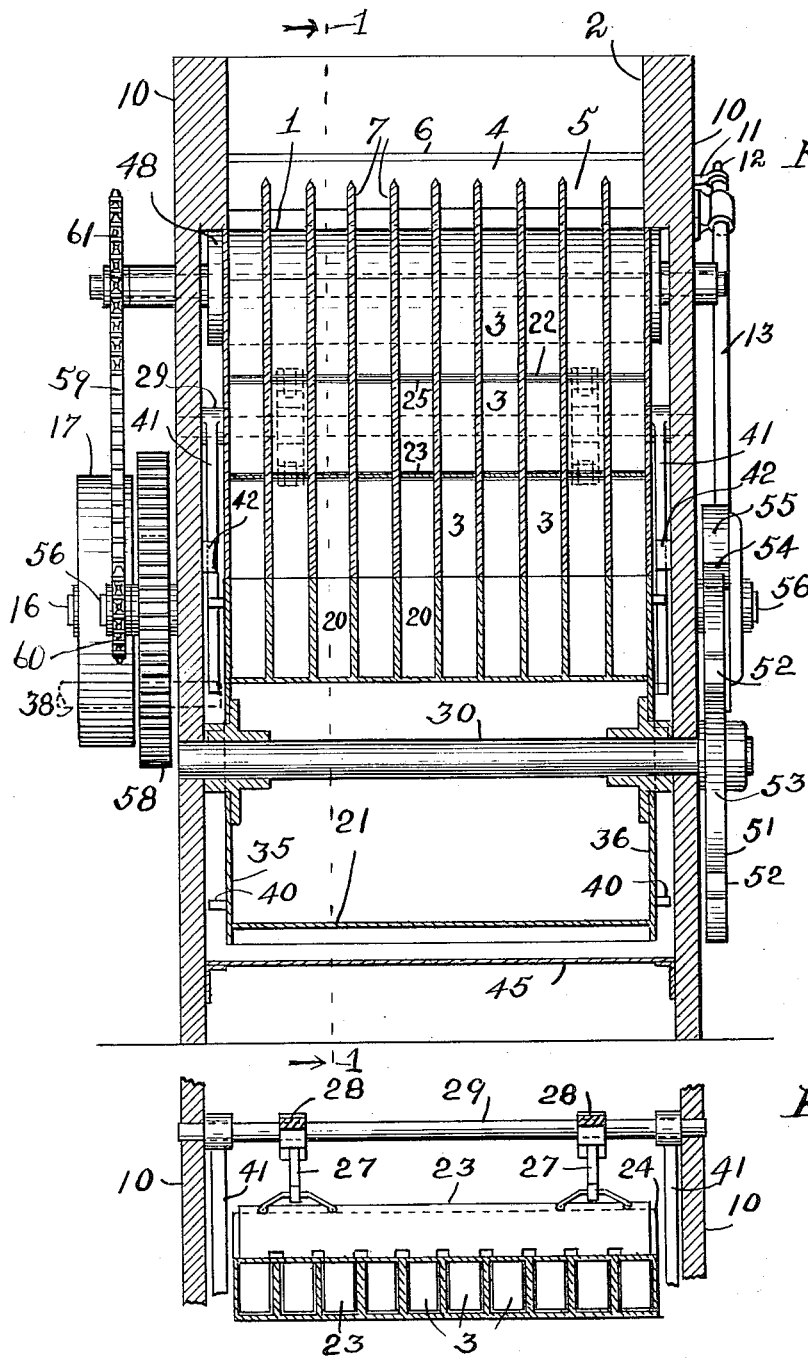

UNITED STATES PATENT OFFICE.

DEWEY C. THOMPSON, OF BERLIN, WISCONSIN, ASSIGNOR TO THE PHINNEY ENGINEERING CO., OF CHILLICOTHE, OHIO, A CORPORATION OF OHIO.

VEGETABLE-CUTTER.

1,058,116.        Specification of Letters Patent.      Patented Apr. 8, 1913.

Application filed September 28, 1908. Serial No. 455,099.

*To all whom it may concern:*

Be it known that I, DEWEY C. THOMPSON, citizen of the United States, residing at Berlin, in the county of Green Lake and State of Wisconsin, have invented certain new and useful Improvements in Vegetable-Cutters; and I hereby declare the following to be a full, clear, and exact description of the invention, such as will enable others skilled in the art to which it appertains to make and use the same.

My invention relates to a novel device for severing the ends from string beans and similar vegetables, the object being to accomplish the result desired in an economical and rapid manner, and consists in the features of construction and combinations of parts hereinafter fully described and claimed.

In the accompanying drawings illustrating my invention, Figure 1— is a vertical longitudinal section on the line 1—1 of Fig. 2 of a machine made in accordance with my invention. Fig. 2— is a vertical transverse section on the line 2—2 of Fig. 1. Fig. 3— is a fragmentary horizontal transverse section on the line 3—3 of Fig. 1. Fig. 4— is a fragmentary horizontal section on the line 4—4 of Fig. 1. Fig. 5— is a fragmentary detail view illustrating the vibratory device for the hopper grating. Fig. 6— is a fragmentary detail vertical section of the operating cylinder taken opposite to that shown in Fig. 1. Fig. 7— is a fragmentary detail section on the line 7—7 of Fig. 6.

In the preparation of string beans for preserving, it is desirable that about three-eighths of an inch be removed from each end of the pod, and to do this by hand has proven an expensive and slow operation. Many attempts have been made to produce a device by means of which this operation could be accomplished practically automatically, but no practical machine for this purpose has yet been placed upon the market.

To accomplish the desired result I have invented the machine herein described and which attains the object perfectly.

The main feature of my invention resides in a horizontal rotating cylinder provided with radial pockets adapted to receive the pods after one end of same has been severed by a knife attached to the outer surface of the cylinder, then as the cylinder continues to rotate, the pods, in dropping out of the cylinder, have their opposite ends severed by means of a stationary knife held adjacent to the periphery of the cylinder. The knives and pockets are so arranged that the severed ends are separated from the pods and can be delivered in different bins. To complete the automatic operation of the machine a feeding device is provided adapted to feed the pods from a promiscuous pile, successively endwise into said pockets.

Referring now to said drawings, the machine comprises a horizontally disposed belt carrier 1 arranged beneath a receiving hopper 2 and adapted to carry the pods from said hopper and deliver them endwise and successively to the vertical chutes 3 arranged at the delivery end of said carrier. Said hopper is provided in its lower portion with a grating 4, the openings 5 in which are longer than they are wide, and are arranged longitudinally in relation to the movement of said carrier belt 1. The lower edge of the transverse partitions 6 of said grating 4 are raised sufficiently above said carrier to allow one layer only of pods to pass freely beneath the same, while the lower edge of the longitudinal partitions 7 just clear the upper surface of said carrier. The dimension of said openings 5 transversely of said carrier is less than the length of the shortest pod which is to be operated upon, said dimension having been decided upon as being about two inches, while the length of said pockets is about eight inches; this grating through which the pods have to pass to reach the surface of said carrier thus prevents said pods from assuming any position but one in which they lie lengthwise on said carrier and said carrier can only deliver one layer deep of said pods. It is desirable to agitate said grating slightly to prevent the same from becoming clogged. To accomplish this the forward end of said grating is mounted on a vertical pivot 8 while the rear end is mounted on a lateral horizontal bar 9 which is mounted in openings in the frame 10 of said machine. A connecting rod 11 connects the middle portion of said bar 9 with a crank-pin 12 on the rear end of a horizontally disposed shaft 13 which is provided at its forward end with a bevel pinion 14 meshing with a bevel gear 15, which in turn is mounted upon one end of the laterally mounted shaft 16. The said shaft 16 is provided with a belt pulley 17 by means of which power may be supplied to operate said machine. Thus the rear end of said grating is given a horizontal vibratory movement which tends to keep the pods agitated sufficiently to prevent the clogging of the grating.

Said carrier is mounted on horizontal rollers 18, one or both of which may be driven by suitable connection to the power shaft 16, and it travels in the direction indicated by the arrow.

The openings 5 in said grating practically form obstructed troughs extending longitudinally in relation to said carrier belt, and the pods passing along said troughs are fed into the upper ends of said chutes 3 which extend downwardly nearly vertical a short distance, and thence vertically, disposed directly over and feeding into the pockets 20 in the operating cylinder 21. Valves or cut-offs 22 and 23 are arranged to operate in the vertical portion of said chutes 3, whereby the pods may be retarded in their progress down the same so that they will be permitted to drop into said cylinder at the proper moment. Said cut-offs 22 and 23 are mounted in guides 24 secured to the rear wall of said chutes and are adapted to extend through openings 25 in said rear walls and obstruct said chutes as indicated at 26 Fig. 1. Said cut-offs are connected by means of links 27 to crank arms 28 rigidly mounted on a horizontal shaft 29 and which extends diametrically opposite to each other, said shaft 29 being located about midway between said cut-offs 22 and 23 and mounted in bearings in said frame 10 of said machine. Said shaft is given an oscillatory movement by means to be described later, by which, when the cut-off 22 is withdrawn from the chutes, the cut-off 23 will enter same, and vice versa. Said operating cylinder 21 is rigidly mounted on a horizontal shaft 30, mounted in bearings in said machine frame and is provided with a plurality (in this instance five) of rows of said pockets 20, the rows of pockets being adapted to be brought successively beneath the ends of the chutes 3 and with which they exactly coincide. Said pockets 20 extend from the outer surface of said cylinder 21 toward the axis of same and are adapted to receive the pods after the lower or first end of same has been removed. Between said longitudinal rows of pockets 20 the surface of said cylinder is provided with a longitudinally disposed cutting edge 32 a short distance in advance of each of said longitudinal rows of pockets, and between said cutting edges or knives 32 and the next longitudinal row of pockets in front of same the surface of said cylinder is depressed slightly and concentrically, the amount of the depression being a measure of the amount which will be severed from the end of the pod. Between said cutting edges 32 and the next adjacent longitudinal row of pockets 20 to the rear of same the surface 33 of the cylinder is flush with said cutting edges and mouths of said pockets. Beneath the surface portions 33 of said cylinder 21 there are longitudinal pockets 34 formed in said cylinder which are adapted to receive the severed ends of said pods, and extend between the heads 35 and 36 of same. To remove the severed ends from said pockets 34 a blast of air is introduced through an opening 37 in said head 35 from the air blast pipe 38, and said pod ends are blown out of said pockets 34 through the openings 39 provided in the head 36. The depressed portion of said cylinder surface extends slightly beneath the knife edges 32 to prevent the pods, should they be lying at a slight angle, from passing lengthwise through the opening between said knife edge and said depressed portion into the pockets 34 and becoming thereby mixed with the refuse. The heads 35 and 36 of said cylinder are each provided with a row of longitudinally projecting pins 40 equal in number to the number of rows of pockets, and arranged to successively engage arms 41 rigidly mounted upon and depending from said shaft 29 which are adapted to operate said cut-offs 22 and 23. Stops 42 are secured to the inner face of said frame 10 adapted to limit the movement of said arms 41 in one direction, and springs 43 are provided secured at one end to the upward extending arms 28 and at the other to a rod 44 rigidly mounted in said frame 10 and adapted to return said arms 41 and cut-offs 22 and 23 to the position shown in Fig. 1 as soon as the lower end of said arms 41 are free from said pins 40. By this means, while the withdrawing of the cut-off 23 and the coincident entering of the cut-off 22 may be comparatively slow, the opposite movement will be comparatively rapid, thus preventing the pods which may have lodged upon the cut-off 22 while it has been closed from falling beyond the cut-off 23 before the same is closed and thus become jammed between said cut-off and the walls of said chutes 3. To the rear of said chutes 3 a stationary casing 45 surrounds said cylinder 31 and extends close to same around to about one-third of the distance from the bottom of same at 46 Fig. 1, where it is depressed outwardly, and from there it is formed concentrically and slightly past the bottom line of said cylinder. Above the free lower edge 47 of said casing 45 and slightly to the rear of same is situated a stationary longitudinal cutting edge 48 which is rigidly mounted upon a bar or plate 49 of the frame of said machine. The outer surface of said cylinder is adapted to pass close to the inner surface of the knife 50 carrying said cutting edge 48.

To give the cylinder and the cut-offs the proper relative movements, the familiar pin and slot or any other suitable gearing may be employed. The plate 51 provided with the five radial slots 52 and the five circular depressions 53 in its periphery is provided, rigidly mounted on one end of said shaft 30 upon which said cylinder 21 is mounted and is adapted to be engaged by the pin 54 by means of which it is revolved through one-fifth of a revolution at a time, and also alternately by the circular detent 55 which holds said plate 51 and consequently said cylinder 21 stationary during approximately two-thirds of each revolution of said pin 54. Said gearing is so arranged that the cylinder 21 is held stationary in the position illustrated in the drawings. Said pin 54 and detent 55 are rigidly mounted together, and are mounted on the horizontal shaft 56 which receives power from said shaft 16 through the gears 57 and 58 mounted respectively on said shafts 16 and 56. Said carrier 1 is operated from said shaft 56 through the chain 59 and sprockets 60 and 61 which are shown in full in Fig. 2 and in dotted lines in Fig. 1 simply to indicate their relative positions, and the speed of said carrier can be changed in relation to the rotation of said cylinder by changing the relative sizes of said sprockets.

In operation, a quantity of the pods having been placed in the hopper, the agitating grating disturbs the pods and they fall through the grating lengthwise upon the carrier, which carries them forward in a single layer, and deposits them in the chutes 3, down which they slide and rest in a vertical position on said cut-off 23, the cylinder being in the position shown in the drawings. Said pin 54 in the position illustrated is about to engage the plate 51 in one of the slots 52, and as it thus turns said cylinder 21 said cut-offs 22 and 23 are moved to their opposite position, that is, 23 is withdrawn and 22 is inserted and the pods which have accumulated on said cut-off 23 are permitted to descend, and the cylinder 21 having turned through a small angle, the lower ends of the pods rest upon the depressed portion of the cylinder surface and in the path of the advancing knife edge 32 which severs the lower ends of said pods against the rear wall of said chutes 3, the pods remaining in the chutes 3 until the following row of pockets 20 is brought beneath same, when they fall into said pockets. In the meantime the pins 40 have released the lower ends of said arms 41 and said springs 43 have quickly returned the cut-offs 22 and 23 to the position illustrated. Now, considering the lower side of the cylinder, the pockets 20, to the left in Fig. 1, have each their quota of pods, the ends of which, nearest the axis of the cylinder, have been cut off. As the pockets are successively carried around toward the bottom the pods slide to the outer end of said pockets and their outer ends rest on the depressed portion of said casing 45 as shown at 46$^a$, and as the cylinder moves from the position shown to its next position, what are now the lower or outer ends of the pods are severed by means of the rear wall of said pockets 20 pressing said pods against the knife 48, the severed ends dropping to the floor on one side of the plate 49, and the finished pods on the other or outer side of same.

I claim as my invention:

1. In a machine of the kind specified, the combination with a feed device, of a movable carrier adapted to receive the pods and having a cutter which moves with the carrier and between which and the feed device one end of the pod is adapted to be cut off, and a stationary cutter which is arranged adjacent to said carrier and between which and said cutter the opposite end of the pod is adapted to be cut off.

2. In a machine of the kind specified, the combination of a rotatable carrier having a cutter movable with the carrier, a feed chute between which and said movable cutter one end of the pods is adapted to be cut off, and a stationary cutter between which and said carrier the other end of said pods is adapted to be cut off.

3. In a machine of the kind specified, the combination of a carrier rotatable about a horizontal axis and having a cutter movable with the carrier, a feed chute which is arranged above the carrier and between which and said movable cutter one end of the pods is adapted to be cut off, and a stationary cutter which is arranged below the carrier and between which and the carrier the opposite end of the pods is adapted to be cut off.

4. In a machine of the kind specified, the combination with a cylindrical carrier rotatable about a horizontal axis and having a plurality of pockets which are open at their outer ends and closed at their inner ends, cutters which are arranged in front of each of said pockets, a feed chute between which and said cutters one end of each pod is adapted to be cut off and which directs the pod into the next following pocket, and a stationary cutter between which and each of said pockets the opposite ends of pods are adapted to be cut off and which causes the last mentioned pod ends and the pods to be discharged at different places from the machine.

5. In a machine of the kind specified, the combination of a feed chute, a rotatable carrier having a cutter between which and the chute one end of each pod is adapted to be cut off, a stationary cutter between which and the carrier the other end of each pod is adapted to be cut off, means for controlling the passage of pods through said chute comprising two valves which are at different places in said chute, means for opening and closing said valves alternately, a feed belt whereby the pods are delivered into said chute, and means for alining the pods lengthwise on said belt.

6. In a machine of the kind specified the combination with the feed chute, of a traveling cutter provided with shallow pockets receiving the ends of the pods, and a cutter at the rear end of each pocket and co-acting with one wall of the feed chute to shear the ends of the pods, and deeper pockets underneath said cutters connected with and forming enlarged extensions of said shallow pockets adapted to receive the severed ends of the pods.

7. In a machine of the kind specified the combination with the feed chute, of a traveling cutter provided with shallow pockets receiving the ends of the pods, and a cutter at the rear end of each pocket and co-acting with one wall of the feed chute to shear the ends of the pods, and deeper pockets underneath said cutters connected with and forming enlarged extensions of said shallow pockets adapted to receive the severed ends of the pods, there being openings in the end walls of said pockets through which the said ends of the pods are ejected.

8. In a machine of the kind specified the combination with the feed chute, of a traveling member equipped with alternate shallow and deep pockets respectively successively passing the delivery end of said chute, a cutter at the rear end portion of each shallow pocket and co-acting with a wall of said chute to sever the end portion of the pods, said deep pockets receiving the body portions of the pods and transporting the same, and means co-acting with one wall of each of said deep pockets to sever the other end portions of said pods.

9. In a machine of the kind specified the combination with the feed chute, of a traveling member equipped with alternate shallow and deep pockets respectively successively passing the delivery end of said chute, a cutter at the rear end portion of each shallow pocket and co-acting with a wall of said chute to sever the end portion of the pods, there being recesses underneath said cutters adapted to receive the severed ends of the pods, said deep pockets receiving the body portions of the pods and transporting the same, and means co-acting with one wall of each of said deep pockets to sever the other end portions of said pods.

10. In a machine of the kind specified the combination with the feed chute, of a traveling member equipped with alternate shallow and deep pockets respectively successively passing the delivery end of said chute, a cutter at the rear end portion of each shallow pocket and co-acting with a wall of said chute to sever the end portion of the pods, there being recesses underneath said cutters adapted to receive the severed ends of the pods, there being openings in the end walls of said recesses for ejection of the contents thereof, said deep pockets receiving the body portions of the pods and transporting the same, and means co-acting with one wall of each of said deep pockets to sever the other end portions of said pods.

11. In a machine of the kind specified the combination with the feed chute of a rotating member provided with shallow pockets receiving the ends of the pods, and a cutter at one end of each pocket and co-acting with one wall of the feed chute to shear the ends of the pods.

12. In a machine of the kind specified the combination with the feed chute of a rotating member provided with shallow pockets receiving the ends of the pods, and a cutter at one end of each pocket and co-acting with one wall of the feed chute to shear the ends of the pods, and pockets underneath said cutters receiving the severed ends of the pods.

13. In a machine of the kind specified the combination with the feed chute of a rotating member provided with shallow pockets receiving the ends of the pods, and a cutter at one end of each pocket and co-acting with one wall of the feed chute to shear the ends of the pods, and pockets underneath said cutters receiving the severed ends of the pods, there being openings in the end walls of said pockets through which the said ends of the pods are ejected.

14. In a machine of the kind specified the combination with the feed chute, of a rotating member equipped with alternate shallow and deep pockets respectively successively passing the delivery end of said chute, a cutter at the rear end portion of each shallow pocket and co-acting with a wall of said chute to sever the end portion of the pods, said deep pockets receiving the body portions of the pods and transporting the same, and means co-acting with one wall of each of said pockets to sever the other end portions of said pods.

15. In a machine of the kind specified the combination with the feed chute, of a rotating member equipped with alternate shallow and deep pockets respectively successively passing the delivery end of said chute, a cutter at the rear end portion of each shallow pocket and co-acting with a wall of said chute to sever the end portion of the pods, there being recesses underneath said cutters adapted to receive the severed ends of the pods, said deep pockets receiving the body portions of the pods and transporting the same, and means co-acting with one wall of each of said deep pockets to sever the other end portions of said pods.

16. In a machine of the kind specified the combination with the feed chute, of a rotating member equipped with alternate shallow and deep pockets respectively successively passing the delivery end of said chute, a cutter at the rear end portion of each shallow pocket and co-acting with a wall of said chute to sever the end portion of the pods, there being recesses underneath said cutters adapted to receive the severed ends of the pods, there being openings in the end walls of said recesses for ejection of the contents thereof, said deep pockets receiving the body portions of the pods and transporting the same, and means co-acting with one wall of each of said deep pockets to sever the other end portions of said pods.

17. In a machine of the kind specified the combination with the feed chute, of a rotating cylinder equipped with alternate shallow and deep pockets respectively successively passing the delivery end of said chute, a cutter at the rear end portion of each shallow pocket and co-acting with one wall of said chute to sever the end portion of the pods, said deep pockets receiving the body portion of the pods and transporting them to the lower side of the cylinder, a stationary guard mounted adjacent and concentric with said cylinder allowing said pods to project from said deep pockets a predetermined amount as they are carried around the lower side of said cylinder, and means co-acting with one wall of each of said deep pockets to sever the other end portions of said pods.

18. In a machine of the kind specified the combination with the feed chute, of a rotating cylinder equipped with alternate shallow and deep pockets respectively successively passing the delivery end of said chute, a cutter at the rear end portion of each shallow pocket and co-acting with one wall of said chute to sever the end portion of the pods, there being recesses underneath said cutters adapted to receive the severed ends of the pods, said deep pockets receiving the body portion of the pods and transporting them to the lower side of the cylinder, a stationary guard mounted adjacent and concentric with said cylinder allowing said pods to project from said deep pockets a predetermined amount as they are carried around the lower side of said cylinder, and means co-acting with one wall of each of said deep pockets to sever the other end portions of said pods.

19. In a machine of the kind specified the combination with the feed chute, of a rotating cylinder equipped with alternate shallow and deep pockets respectively successively passing the delivery end of said chute, a cutter at the rear end portion of each shallow pocket and co-acting with one wall of said chute to sever the end portion of the pods, there being recesses underneath said cutters adapted to receive the severed ends of the pods, there being openings in the end walls of said recesses for ejection of the contents thereof, said deep pockets receiving the body portion of the pods and transporting them to the lower side of the cylinder, a stationary guard mounted adjacent and concentric with said cylinder allowing said pods to project from said deep pockets a predetermined amount as they are carried around the lower side of said cylinder, and means co-acting with one wall of each of said deep pockets to sever the other end portions of said pods.

20. In a machine of the kind specified the combination with the feed chute, of a traveling member equipped with alternate shallow and deep pockets respectively successively passing the delivery end of said chute, means regulating the descent of the pods down said chute, a cutter at the rear end of each shallow pocket and co-acting with one wall of said chute to sever the end portion of the pods, said deep pockets receiving the body portion of the pods and transporting the same, and means co-acting with one wall of each of said deep pockets to sever the other end portions of said pods.

21. In a machine of the kind specified the combination with the feed chute, of a traveling member equipped with alternate shallow and deep pockets respectively successively passing the delivery end of said chute, means regulating the descent of the pods down said chute comprising two slides spaced one above the other and adapted to enter said chute, connection between said slides and said traveling member whereby said lower slide is withdrawn and said upper slide is simultaneously entered into said chute at the time that said shallow pocket enters beneath said chute, and said lower slide is entered into and said upper slide is withdrawn at the time said deep pockets enter beneath said chute, a cutter at the rear end of each shallow pocket and co-acting with one wall of said chute to sever the end portion of the pods, said deep pockets receiving the body portion of the pods and transporting the same, and means co-acting with one wall of each of said deep pockets to sever the other end portions of said pods.

22. In a machine of the kind specified the combination with the feed chute of a traveling member equipped with alternate shallow and deep pockets respectively successively passing the delivery end of said chute, means for delivering the pods to the receiving end of said chute, comprising a feed belt, a hopper above said feed belt, a vibrating grating in the lower end of said hopper, said grating provided with oblong openings arranged longitudinally in relation to seed feed belt, means co-acting with said traveling member regulating the flow of pods down said chute, a cutter at the rear end of each of said shallow pockets and co-acting with one wall of said chute to sever one portion of the pods, said deep pockets receiving the body portions of the pods, and means co-acting with one wall of each of said deep pockets to sever the other end portions of said pods.

23. In a machine of the kind specified the combination with the feed chute of a traveling member equipped with alternate shallow and deep pockets respectively successively passing the delivery end of said chute, means for delivering the pods to the receiving end of said chute, comprising a feed belt, a hopper above said feed belt, means for regulating the delivery of pods to said chute by said feed belt comprising a vibratory grating in the lower end of said hopper, said grating consisting of longitudinal bars which just clear the surface of said belt, and of transverse bars which clear the surface of said belt by a predetermined amount, the openings formed by said bars being narrow transversely and long longitudinally of said belt whereby the pods arrange themselves longitudinally of the carrier belt, and are thereby delivered endwise into the receiving end of said chute, means co-acting with said traveling member regulating the flow of pods down said chute, a cutter at the rear end of each of said shallow pockets and co-acting with one wall of said chute to sever one portion of the pods, said deep pockets receiving the body portions of the pods, and means co-acting with one wall of each of said deep pockets to sever the other end portions of said pods.

In testimony whereof I have signed my name in presence of two subscribing witnesses.

DEWEY C. THOMPSON.

Witnesses:
H. E. BAREIS,
DENNIS HART.